(No Model.)

C. C. BROWN.
THILL COUPLING.

No. 561,651. Patented June 9, 1896.

WITNESSES:
W. E. Fletcher
C. Gersh

INVENTOR
Chauncey C. Brown
BY Edgar Tate & Co
ATTORNEYS.

ANDREW B.GRAHAM, PHOTO-LITHO. WASHINGTON, D.C.

UNITED STATES PATENT OFFICE.

CHAUNCEY CICERO BROWN, OF MARQUETTE, MICHIGAN, ASSIGNOR OF ONE-HALF TO WILLIAM OLIVER, JR., OF LOWVILLE, NEW YORK.

THILL-COUPLING.

SPECIFICATION forming part of Letters Patent No. 561,651, dated June 9, 1896.

Application filed February 19, 1896. Serial No. 579,813. (No model.)

*To all whom it may concern:*

Be it known that I, CHAUNCEY CICERO BROWN, a citizen of the United States, and a resident of Marquette, in the county of Marquette and State of Michigan, have invented certain new and useful Improvements in Devices for Coupling Shafts with Vehicles, of which the following is a specification, reference being had to the accompanying drawings, forming a part thereof, in which similar letters of reference indicate corresponding parts.

This invention relates to the shafts of buggies, carriages, and similar vehicles, and particularly to devices for connecting said shafts therewith; and the object thereof is to provide an improved device or devices for this purpose whereby the connection of the shafts with the vehicle may be quickly and easily made and the disconnection thereof also easily accomplished, a further object being to provide a device of this class which will prevent the rattling of these parts, which is frequently very objectionable, and also to avoid the danger which results from the use of nuts and bolts for this purpose. These objects I accomplish by means of the mechanism hereinafter described and claimed; and the invention is fully disclosed in the following specification, of which the accompanying drawings form a part, in which—

Figure 1:
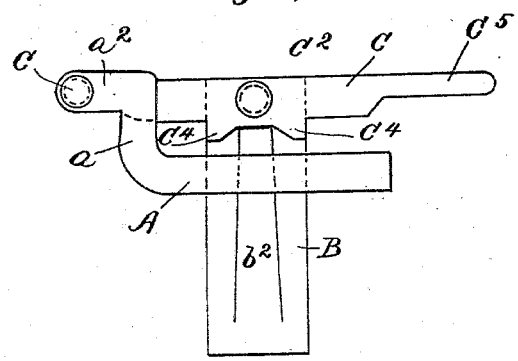
Figure 3:
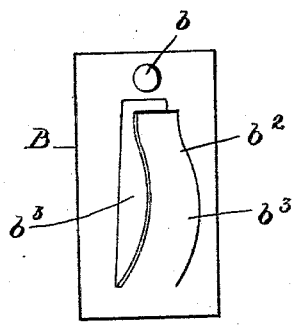
Figure 2:
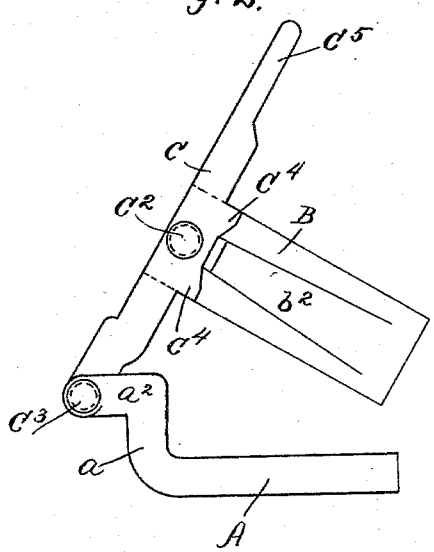

Figure 1 is a plan view of a coupling-pin and a spring and lever connected therewith which I employ, said parts being shown in a position relative to each other which they occupy when connected with the parts to be coupled; Fig. 2, a plan view of the same parts in a position ready to be inserted into the parts to be connected or coupled; Fig. 3, a side view of a spring-plate which I employ; and Fig. 4, a side view of the coupling-clip, which is connected with the axle of the vehicle, with a shaft in place, and an end view of the coupling attachment inserted or in the position which it occupies when the shaft is connected with the axle.

In the practice of my invention I provide a coupling-pin A, which is composed of iron or other preferred metal and provided with an angular arm or extension $a$ at one end thereof, at the end of which is formed a shoulder or projection $a^2$, which extends in line with the coupling-pin A and in an opposite direction therefrom. I also provide a metal spring-plate B, which is made of steel or other and similar material and provided at one end with an aperture $b$ and a spring-tongue $b^2$, which is cut from the central portion thereof, whereby an oblong slot $b'$ is formed, and the end of the tongue $b^2$, adjacent to the hole or opening $b$, is free and the body portion thereof is curved outwardly, as shown at $b^3$, and the lower end of the spring-plate K is also curved outwardly, as shown at $b^4$ in Fig. 4.

Connected with the end of the spring-plate B is a lever C, which is connected with said plate by a pin or bolt $C^2$, which passes through the central portion thereof and through the hole or opening $b$ in said plate, and one end of said lever is pivotally connected with the shoulder or projection $a^2$ of the coupling-pin A, as shown at $C^3$, and formed thereon at each side of its pivotal connection with the spring-plate B are shoulders or projections $C^4$, and said lever is provided with a flat bearing or extension $C^5$.

Figure 4:
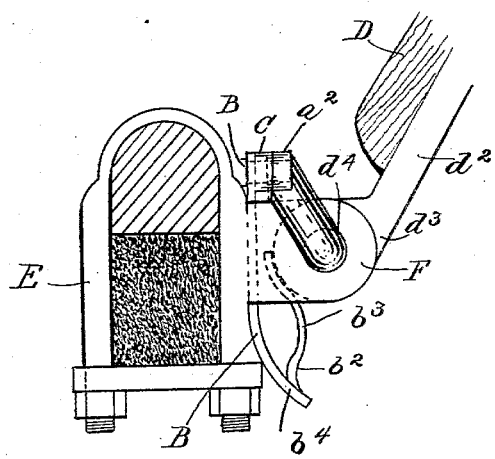

The rear end of one of the shafts of the vehicle is shown at D in Fig. 4, and the shaft is connected with a metal arm or plate, which is provided with a circular head $d^3$, through which is formed a transverse hole or aperture $d^4$, and E represents the clip or yoke, which is connected with the axle of the vehicle and provided with a clevis F at one side thereof, through the sides of which are formed holes or apertures in the usual manner.

The several parts, when constructed as herein described, are secured together or connected with each other in the following manner: The coupling-pin A is connected with the lever C at $C^3$, as hereinbefore described, and the spring-plate B is connected with the lever C at $C^2$, each of these connections being pivotal connections, and when the three parts are thus connected the lever C is raised, as shown in Fig. 2, and the coupling-pin A is inserted through the clevis F and through the head $d^3$ of the arm $d^2$ of the shaft D, the head $d^3$ of said arm being placed between the separate jaws of the clevis, as will be readily understood. The lower end of the spring-plate B is then inserted into the recess between the rear end of the head $b^3$ and the side of the clip E, between the separate jaws of the clips, and pressure on the lever C is then applied to force the spring-plate B downwardly, so that the outwardly-curved portion of the tongue $d^3$ will press outwardly at a point somewhat below the center of the head $d^3$ of the arm $d^2$, as clearly shown in Fig. 4, thereby forming an antirattler and holding down the lever C, which holds in place the coupling-pin A, thus making a substantial and secure coupling. The shoulders or projections $C^4$ on the lever C rest within the recess formed by the jaws of the clevis and prevent any sidewise or lateral strain upon the rivet or pivotal connection of the lever C and the spring-plate D.

To remove or uncouple the parts, the lever C is raised, and this operation lifts the spring-plate and removes the tension and permits of the easy removal of the coupling-pin A, thus releasing the shaft D.

This device is simple in construction and comparatively inexpensive, and is perfectly adapted to accomplish the result for which it is intended; and it is evident that changes in and modifications of the construction herein described may be made without departing from the spirit of my invention, and I reserve the right to make all such alterations therein and modifications thereof as fairly come within the scope of the invention.

Having fully described my invention, I claim as new and desire to secure by Letters Patent—

A thill-coupling, constructed substantially as herein shown and described, consisting of coupling-pin A, provided with an angular arm having terminal projection in line with the body of the said pin, a lever C pivoted at one end to the said projection and provided centrally with shoulders $C^4$ projecting from its lower edge and a spring-plate B, provided with tongue $b^2$ and central slot $b^3$, said plate being pivoted at its upper end to the said lever at a point midway between the shoulders of the latter, all arranged and adapted to operate as set forth.

In testimony that I claim the foregoing as my invention I have signed my name, in presence of the subscribing witnesses, this 14th day of February, 1896.

CHAUNCEY CICERO BROWN.

Witnesses:
IDA F. OLIVER,
L. AGNES BROWN.